UNITED STATES PATENT OFFICE.

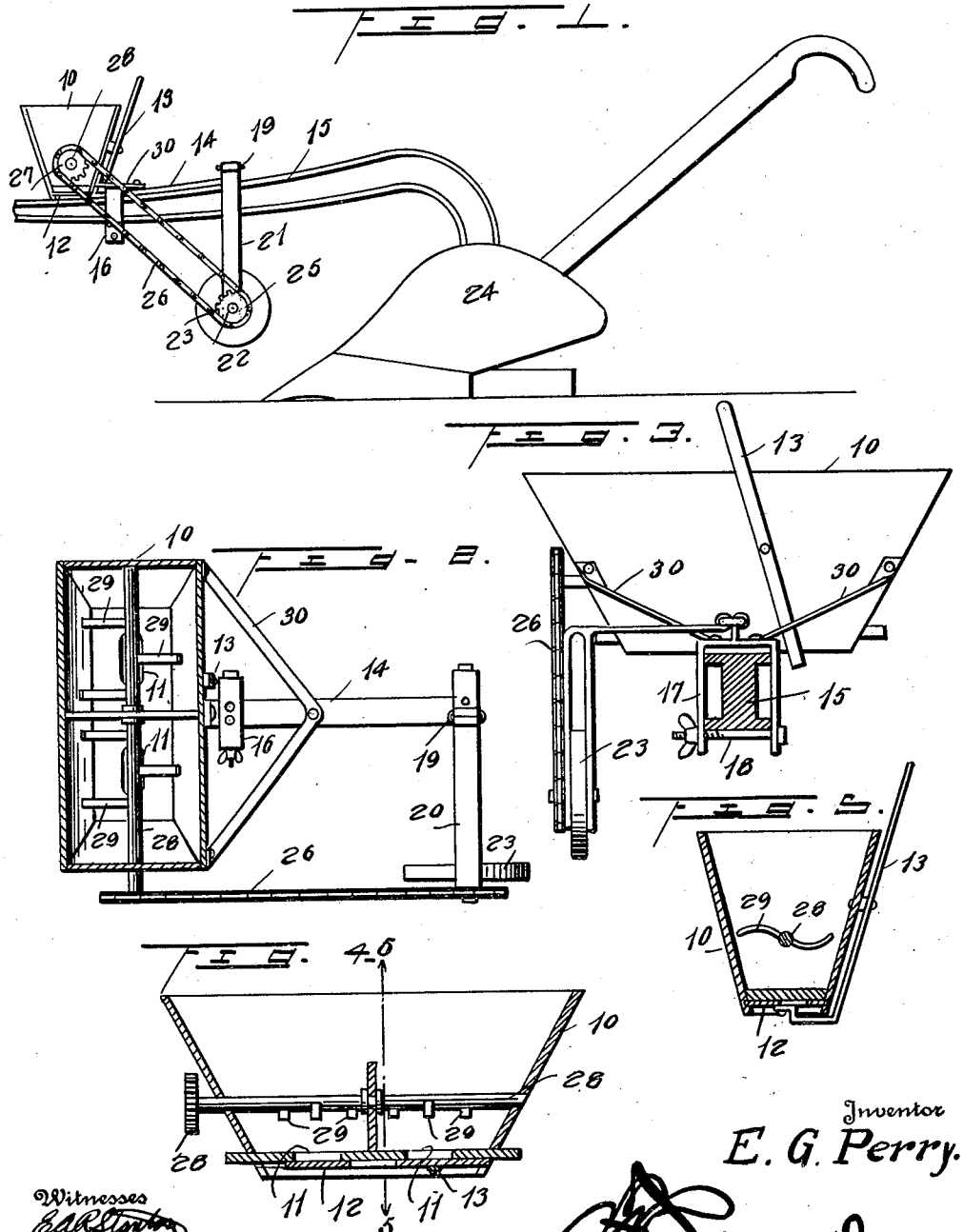

ELMER G. PERRY, OF SPRING HOPE, NORTH CAROLINA.

FERTILIZER-DISTRIBUTER.

1,342,296.  Specification of Letters Patent.  Patented June 1, 1920.

Application filed September 27, 1918. Serial No. 255,942.

*To all whom it may concern:*

Be it known that I, ELMER G. PERRY, a citizen of the United States, residing at Spring Hope, in the county of Nash and State of North Carolina, have invented certain new and useful Improvements in Fertilizer-Distributers; and I do hereby declare the following to be a full, clear, and exact description of the invention, such as will enable others skilled in the art to which it appertains to make and use the same.

The object of the invention is to provide a simple, inexpensive and efficient apparatus for distributing fertilizer, and also adapted under certain conditions to be used as a seeder, the same being constructed in such a way as to be readily adaptable to a plow of the ordinary construction and having means whereby the same may be secured to and carried by the plow beam, the means of attachment being of such a construction as to adapt the apparatus to be used or not as may be required in the course of the cultivating operation.

Further objects and advantages will appear hereinafter it being understood that changes in form and proportion may be resorted to within the scope of the appended claim without departing from the spirit of the invention.

In the drawing:

Figure 1 is a side view of the fertilizer distributer arranged in the operative position upon a plow.

Fig. 2 is a plan view of the distributer.

Fig. 3 is a rear view of the same.

Fig. 4 is a sectional view taken on a plane parallel with the agitator shaft.

Fig. 5 is a sectional view taken on the plane indicated by the line 5—5 of Fig. 4.

The fertilizer box 10 is provided in its bottom with the required or desired number of outlets 11 which may be closed when desired by means of a sliding cutoff 12, for which purpose an operating handle or lever 13 is connected therewith. The box is supported by means of a longitudinal bar 14 adapted to bear upon the upper surface of a plow beam 15 and provided at its front and rear ends respectively with a clamp 16 for engagement with the beam, and a yoke 17 between the lower extremities of the arms of which extends a bolt 18 serving as a supplemental means of maintaining the apparatus in position upon the plow beam.

Extending laterally from the yoke and hingedly connected therewith, as shown at 19, is a bracket arm 20 terminating in a fork 21 between the arms of which is mounted a ground wheel 22 having a transverse shaft or spindle 23, said ground wheel being adapted to traverse the surface of the ground on the land side of the plow 24. Also carried by the shaft or spindle 23 is a sprocket wheel 25 connected by a chain 26 with a sprocket 27 on the agitator shaft 28 which is mounted in bearings in the end walls of the fertilizer box and extends longitudinally therethrough, said shaft being provided with agitator fingers or blades 29.

The apparatus as described may be attached to or removed from the plow beam merely by the manipulation of the clamping means which are carried by the longitudinal frame bar 14 which may, as shown in Fig. 2, be provided with suitable braces 30, and as the ground wheel traverses the surface of the soil in the course of forming a furrow, the agitator is operated to cause the fertilizer to feed through the outlet opening and drop in the path of the plow.

Obviously, the fertilizer box or hopper may be of any desired size or capacity to suit the conditions of use, and the hinged relation between the fork supporting arms and the attaching frame of the device provides for the ground wheel following inequalities of the surface without disturbing the relation between the parts by which motion is communicated to the agitator in the hopper, to the end that a relatively even distribution of the fertilizer may be secured.

Having described the invention what is claimed is:

A fertilizer attachment for plows comprising a hopper having outlets, means for connecting the hopper with a plow beam with the hopper extending transversely from the plow beam, an agitator shaft extending through the hopper and having agitator arms extending therefrom in the hopper, a sprocket wheel mounted upon the outer end portion of the shaft, a clamping bracket adapted for connection with the plow beam to the rear of the hopper and having an upstanding arm terminating in a bearing eye, a fork having an arm pivotally connected with said eye to mount the fork for vertical swinging movement, a ground wheel rotatably mounted in said fork and having an extended axle, a sprocket wheel carried by said axle, and a sprocket chain passing about the sprocket wheels of said axle and said distributer shaft whereby rotary movement will be transmitted to the distributer shaft from said ground wheel.

In testimony whereof I affix my signature in presence of two witnesses.

ELMER G. PERRY.

Witnesses:
 E. W. GIFFIN,
 B. F. WOOD.